United States Patent
Choi et al.

(10) Patent No.: US 10,950,148 B2
(45) Date of Patent: Mar. 16, 2021

(54) DEVICE INCLUDING STRETCHABLE DISPLAY AND METHOD OF CONTROLLING THE DEVICE

(71) Applicant: Samsung Display Co., Ltd., Yongin-si (KR)

(72) Inventors: Jinwoo Choi, Yongin-si (KR); Rangkyun Mok, Yongin-si (KR); Wonil Choi, Yongin-si (KR); Jaeik Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/826,089

(22) Filed: Aug. 13, 2015

(65) Prior Publication Data

US 2016/0183364 A1      Jun. 23, 2016

(30) Foreign Application Priority Data

Dec. 19, 2014   (KR) ........................ 10-2014-0184954

(51) Int. Cl.
*H05K 1/02* (2006.01)
*G09F 9/30* (2006.01)
(Continued)

(52) U.S. Cl.
CPC ............ *G09F 9/301* (2013.01); *G06F 1/1652* (2013.01); *H04M 1/0268* (2013.01)

(58) Field of Classification Search
CPC ......... H05K 1/0283; G09F 9/301; G09F 9/00; G06F 1/1652; G06F 1/163; G06F 1/1694;
(Continued)

(56) References Cited

U.S. PATENT DOCUMENTS 7,446,757 B2 * 11/2008 Mochizuki ............ G06F 1/1616
345/168
8,736,162 B2    5/2014 Jin et al.
(Continued)

FOREIGN PATENT DOCUMENTS

CN         102855821 A      1/2013
CN         103197879 A      7/2013
(Continued)

*Primary Examiner* — Rockshana D Chowdhury
(74) *Attorney, Agent, or Firm* — Lewis Roca Rothgerber Christie LLP

(57) ABSTRACT

A device including a stretchable display and a method of controlling the device are disclosed. In one aspect, the device includes a stretchable display including a display unit formed on a front side of the stretchable display and configured to display images in a display area. The device also includes a support attached to a rear surface of the stretchable display and including a battery and a controller. The device further includes a sensor formed on the support. The support further includes a folding portion along which the support and stretchable display are configured to be folded and a bending portion along which the support and stretchable display are configured to be bent. The sensor is formed at a position corresponding to the folding portion or the bending portion and the sensor is configured to sense when the device is bent or folded.

15 Claims, 4 Drawing Sheets

(51) Int. Cl.
*G06F 1/16* (2006.01)
*H04M 1/02* (2006.01)

(58) Field of Classification Search
CPC ...... G06F 1/1626; H04M 1/0268; G09G 5/00;
G09G 3/3208; G09G 2380/02; G04G 21/08
USPC .................................................... 361/679.01
See application file for complete search history.

(56) References Cited

U.S. PATENT DOCUMENTS

| | | | | |
|---|---|---|---|---|
| 8,929,085 | B2* | 1/2015 | Franklin | G06F 1/3265 361/749 |
| 8,970,455 | B2* | 3/2015 | Thorson | G06F 1/1652 345/55 |
| 2010/0029327 | A1* | 2/2010 | Jee | G06F 1/163 455/556.1 |
| 2010/0164888 | A1* | 7/2010 | Okumura | G06F 3/0416 345/173 |
| 2010/0227642 | A1* | 9/2010 | Kim | H04M 1/0256 455/556.1 |
| 2013/0070431 | A1* | 3/2013 | Fukuma | G06F 1/1652 361/749 |
| 2013/0176248 | A1 | 7/2013 | Shin et al. | |
| 2013/0326790 | A1 | 12/2013 | Cauwels et al. | |
| 2014/0028546 | A1 | 1/2014 | Jeon et al. | |
| 2014/0043226 | A1 | 2/2014 | Lee et al. | |
| 2014/0078047 | A1 | 3/2014 | Seo et al. | |
| 2014/0285476 | A1* | 9/2014 | Cho | H04M 1/0268 345/204 |
| 2014/0361980 | A1* | 12/2014 | Iwaki | G06F 3/14 345/156 |
| 2015/0220188 | A1 | 8/2015 | Zhao | |

FOREIGN PATENT DOCUMENTS

| | | |
|---|---|---|
| CN | 103399616 A | 11/2013 |
| CN | 103558934 A | 2/2014 |
| KR | 10-2007-0105107 A | 10/2007 |
| KR | 10-2014-0013845 A | 2/2014 |
| KR | 10-2014-0034578 A | 3/2014 |
| KR | 10-2014-0036499 A | 3/2014 |

* cited by examiner

Tablet

Cell Phone

Watch

DEVICE INCLUDING STRETCHABLE DISPLAY AND METHOD OF CONTROLLING THE DEVICE

RELATED APPLICATION

This application claims the benefit of Korean Patent Application No. 10-2014-0184954, filed on Dec. 19, 2014, in the Korean Intellectual Property Office, the disclosure of which is incorporated herein in its entirety by reference.

BACKGROUND

Field

The described technology generally relates to a device including a stretchable display and a method of controlling the device.

Description of the Related Technology

As information technology is developed, the market for display devices which display information to users is expanding. Accordingly, the use of flat panel displays (FPDs) such as liquid crystal displays (LCDs), organic light-emitting diode (OLED) displays and plasma display panel (PDP) displays is increasing.

Flexible displays have advantages over traditional display since they are easy to carry by bending, folding, or rolling the display, while providing a large display area when unfolded. Accordingly, flexible displays are an active area of research and development.

SUMMARY OF CERTAIN INVENTIVE ASPECTS

One inventive aspect is a device including a stretchable display and a method of controlling the device.

However, the one or more embodiments are only examples, and the scope of the present disclosure is not limited thereto.

Additional aspects will be set forth in part in the description which follows and, in part, will be apparent from the description, or can be learned by practice of the presented embodiments.

Another aspect is a device including a stretchable display, includes: a stretchable display including a display unit that is included in front of the device to display a screen to a user; a rear surface portion included on a rear surface of the stretchable display and including a battery and a controller; a folding portion included in the rear surface portion and formed to correspond to a portion where the stretchable display is folded; a bending portion included in the rear surface portion and formed to correspond to a portion where the stretchable display is bent; and a sensor unit included at the folding portion and/or the bending portion and sensing folding and/or bending of the device.

Coupling portions can be included at two ends of the rear surface portion.

The coupling portions can be formed of a magnetic unit that fixes the two ends of the device by using a magnetic force.

The coupling portions can be formed of a physical fixing unit so as to fix the two ends of the device.

The device can further include a hinge unit that is formed on a side of the rear surface portion, bends the stretchable display to a predetermined degree, and fixes the stretchable display after bending.

When the sensor unit senses folding and/or bending of the stretchable display, the display unit can be deformed.

Stretchable characteristics of the stretchable display can be the greatest at the bending portion.

Another aspect is a device including a stretchable display, includes a stretchable display including a display unit that is included in front of the device to display a screen to a user, and a rear surface portion included on a rear surface of the stretchable display and including a battery and a controller, wherein the stretchable display and the rear surface portion are folded so that the device is used as a mobile phone, and wherein after being folded, the stretchable display is bent so as to be wound around the wrist of the user to be used as a watch.

The device can further include a coupling portion at each of two ends of the rear surface portion, wherein after the stretchable display is folded and bent, the device is wound around the wrist of the user via the coupling portions to be fixed.

The device can further include a sensor unit that senses folding and/or bending of the stretchable display at a portion where the stretchable display is folded or bent.

When the sensor unit senses folding and/or bending of the stretchable display, the display unit can be deformed.

When the stretchable display is used as a watch, the display unit can be converted to a partial display mode.

When the stretchable display is used as a watch after being folded and bent, coupling via the coupling portions can be released and a degree of bending can be adjusted so that the stretchable display is folded and partially bent to be used as a mobile phone.

Another aspect is a method of controlling a device including a stretchable display, wherein the device includes: a stretchable display including a display unit that is included in front of the device to display a screen to a user; a rear surface portion included on a rear surface of the stretchable display and comprising a battery and a controller; a folding portion included in the rear surface portion and formed to correspond to a portion where the stretchable display is folded; a bending portion included in the rear surface portion and formed to correspond to a portion where the stretchable display is bent; and a sensor unit included at the folding portion and/or the bending portion and that senses folding and/or bending of the device, the method includes: sensing folding and/or bending of the folding portion and/or the bending portion, wherein the sensing is performed by the sensor unit; and changing the display unit, on which a screen is displayed, to a required region, when the sensor unit senses the folding and/or bending.

When the device including a stretchable device is used as a tablet, if folding and bending are sensed by the sensor unit, and the device is wound around the wrist of the user and coupling via the coupling portions is recognized, the controller can control the device so that the device is used as a watch.

When the device including a stretchable device is used as a watch, if release of coupling via the coupling portions is recognized, and release of a portion of bending is sensed by the sensor unit, the controller can control the device so that the device is used as a mobile terminal.

Another aspect is a display device comprising a stretchable display including a display unit formed on a front side of the stretchable display and configured to display images in a display area; a support attached to a rear surface of the stretchable display and comprising a battery and a controller; and a sensor formed on the support, wherein the support further comprises: a folding portion along which the support and stretchable display are configured to be folded; and a bending portion along which the support and stretchable display are configured to be bent, wherein the sensor is formed at a position corresponding to the folding portion or the bending portion, and wherein the sensor is configured to sense when the device is bent or folded.

In exemplary embodiments, the support further comprises a pair of coupling portions at opposing ends of the support. Each of the coupling portions can comprise a magnetic unit and the coupling portions can be configured to fix the opposing ends of the support together. Each of the coupling portions can comprise a physical fixing unit and the coupling portions can be configured to fix the opposing ends of the support together. The support can further comprise a hinge formed on a side of the support and the hinge can be configured to: i) bend the stretchable display to a predetermined curvature and ii) fix the stretchable display at the predetermined curvature.

In exemplary embodiments, when the sensor senses that the device is bent of folded, the display unit is further configured to reduce the size of the display area. The stretchable display can further include a bending portion that is more resilient to stretching than the remainder of the stretchable display.

Another aspect is a display device comprising a stretchable display including a display unit formed on a front side of the stretchable display and configured to display a images in a display area; and a support attached to a rear surface of the stretchable display and comprising a battery and a controller, wherein the stretchable display and the support are configured to be folded, and wherein after being folded, the stretchable display is further configured to be bent so as to be wound around the wrist of a user.

In exemplary embodiments, the support further comprises a pair of coupling portions formed at opposing ends of the support, wherein after the device is wound around the wrist of the user, the coupling portions are configured to be fixed to each other. The display device can further comprise a sensor configured to sense folding or bending of the stretchable display. When the sensor senses that the stretchable display is bent or folded, the display unit can be further configured to reduce the size of the display area.

In exemplary embodiments, when the coupling portions are fixed to each other, the display unit is further configured to reduce the size of the display area. When the stretchable display coupling portions are fixed to each other, the coupling portions can be further configured to be released from each other such that the stretchable display can be partially unfolded.

Another aspect is a method of controlling a display device, the display device comprising a stretchable display including a display unit formed on a front side of the stretchable display and configured to display images in a display area; a support attached to a rear surface of the stretchable display and comprising a battery and a controller; and a sensor formed on the support, wherein the support further comprises: a folding portion along which the support and stretchable display are configured to be folded; and a bending portion along which the support and stretchable display are configured to be bent, wherein the sensor is formed at a position corresponding to the folding portion or the bending portion, wherein the sensor is configured to sense when the device is bent or folded, and wherein the method comprises: the sensor sensing folding or bending of the folding portion or the bending portion; and the display unit adjusting the size of the display area when the sensor unit senses the folding or bending.

In exemplary embodiments, when the sensor senses folding or bending of the device into a substantially circular shape, the controller is configured to control the display unit such that the device is configured for use as a watch.

In exemplary embodiments, when the sensor senses the unfolding or unbending of the device from the substantially circular shape, the controller is further configured to control the device so that the device can be used as a mobile terminal.

These general and specific embodiments can be implemented by using a system, a method, a computer program, or a combination of the system, the method, and the computer program.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Figure 1:
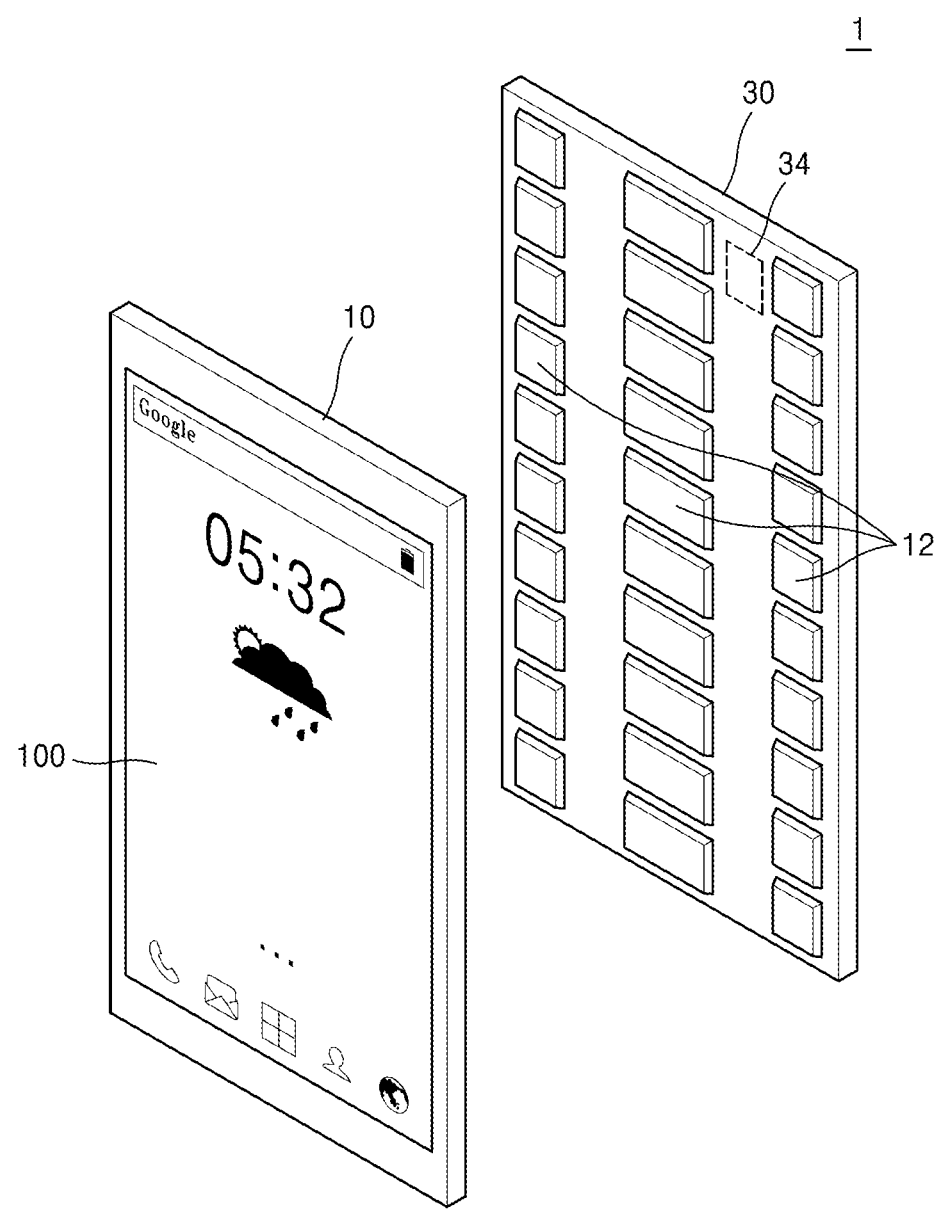
FIG. 1 is a schematic view illustrating a device including a stretchable display according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

As the described technology allows for various changes and numerous embodiments, particular embodiments will be illustrated in the drawings and described in detail in the written description. However, these embodiments are provided so that this disclosure will be thorough and complete to those of ordinary skill in the art. As the described technology allows for various changes and many different forms, particular embodiments will be illustrated in the drawings and described in detail in the written description. However, this is not intended to limit the described technology to particular modes of practice, and it is to be appreciated that all changes, equivalents, and substitutes that do not depart from the spirit and technical scope of the described technology are encompassed therein. Like reference numerals in the drawings denote like elements. In the drawings, the dimension of elements may be exaggerated for the sake of clarity.

While such terms as "first", "second", etc., may be used to describe various components, such components must not be limited to the above terms. The above terms are used only to distinguish one component from another.

The terms used in the present specification are merely used to describe particular embodiments and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While the description is focused on organic light-emitting diodes (OLEDs) as the display technology in embodiments below, the displays are not limited thereto. Any display technology such as a light-emitting diode (LED) display or a liquid crystal display (LCD) can also be used.

Figure 2:
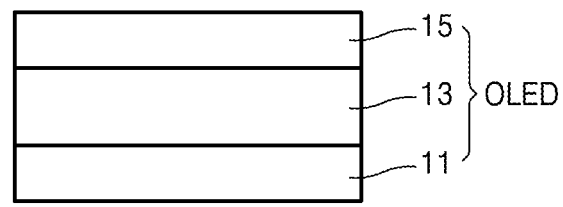
FIG. 2 is a schematic view illustrating an organic light-emitting diode (OLED) included in a stretchable display.
Figure 3:
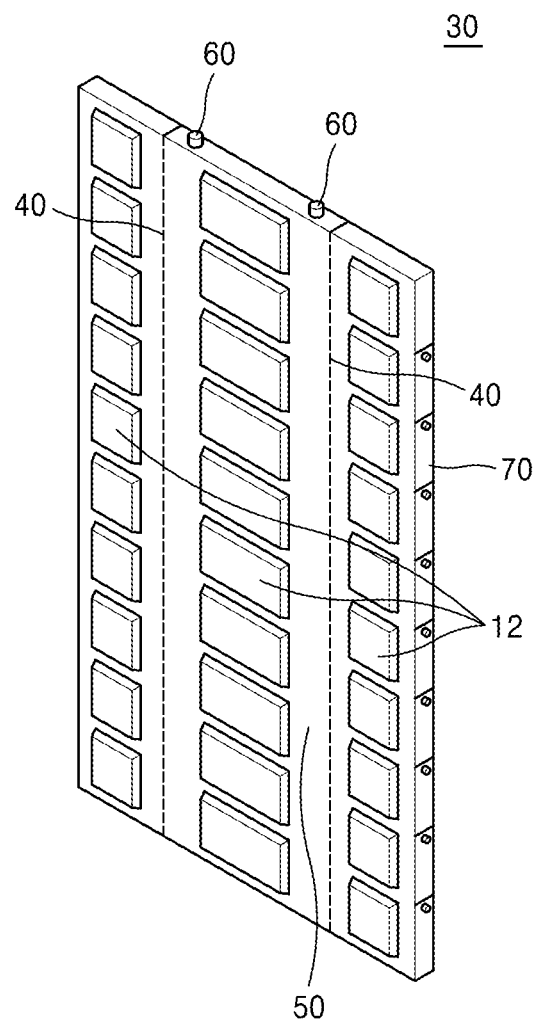
FIG. 3 is a schematic view illustrating a rear surface portion of a stretchable display according to an embodiment.

FIG. 1 is a schematic view illustrating a device 1 including a stretchable display 10 according to an embodiment. FIG. 2 is a schematic view illustrating an OLED included in the stretchable display 10. FIG. 3 is a schematic view illustrating a rear surface portion of the stretchable display 10 according to an embodiment.

The device 1 including a stretchable display according to an embodiment includes the stretchable display 10 including a display unit 100 and a rear surface portion or rigid support 30 attached to the rear surface of the stretchable display 10.

The stretchable display 110 includes a plurality of OLEDs. Each of the OLEDs may be included in a sub-pixel, and each sub-pixel may emit one of red, green, blue, or white colored light.

Each OLED includes a pixel electrode 11, an intermediate layer 13 including an organic emission layer, and an opposite electrode or opposing electrode 15.

Each of the pixel electrode 11 and/or the opposite electrode 15 can be a transparent electrode or a reflective electrode. When the pixel electrode 11 and/or the opposite electrode 15 are transparent electrodes, they may be formed of indium tine oxide (ITO), indium zinc oxide (IZO), zinc oxide (ZnO), or indium oxide (In$_2$O$_3$), and when they are reflective electrodes, they may include a reflective layer formed of silver (Ag), magnesium (Mg), aluminum (Al), platinum (Pt), palladium (Pd), gold (Au), nickel (Ni), neodymium (Nd), iridium (Ir), chromium (Cr), or a compound of these and a transparent layer formed of ITO, IZO, ZnO, or In$_2$O$_3$. According to some embodiments, the pixel electrode 11 or the opposite electrode 115 may have an ITO/Ag/ITO structure.

Holes and electrons injected by the pixel electrode 11 and the opposite electrode 15 of the OLEDs can be recombined in the organic emission layer of the intermediate layer 13 to thereby generate light.

The intermediate layer 13 can include an organic emission layer. Alternatively, the intermediate layer 13 may include, in addition to the organic emission layer, a hole injection layer (HIL), a hole transport layer (HTL), an electron transport layer (ETL), and an electron injection layer (EIL). However, the described technology is not limited thereto, and the intermediate layer 13 may include the organic emission layer and also other various functional layers.

The opposite electrode 15 is formed on the intermediate layer 13. The opposite electrode 15 forms an electrical field with the pixel electrode 11 so that light is emitted from the intermediate layer 13. The pixel electrode 11 may be patterned in each pixel and the opposite electrode 15 may be formed such that a common voltage is applied to all pixels.

Each of the pixel electrode 11 and the opposite electrode 15 may be a transparent electrode or a reflective electrode. In some embodiments, pixel electrode 11 functions as an anode electrode and the opposite electrode 15 functions as a cathode electrode, but they are not limited thereto. For example, the pixel electrode 11 may function as a cathode electrode and the opposite electrode 15 may function as an anode electrode.

However, the described technology is not limited to the above-described embodiment and the intermediate layer 13 can be commonly formed with respect to all the pixel electrodes 11 regardless of the positions of the pixels. The organic emission layer may be formed by vertically stacking layers including emissive materials that emit red, green, or blue light or mixing the layers. However, as long as white light is emitted, the combination of other colors may also be applied. Also, a color converting layer that converts the emitted white light into a predetermined color or a color filter may be further included.

The stretchable display 10 can be formed of a material having stretchable characteristics. That is, the stretchable display 10 can be formed of an elastic and flexible material so that the stretchable display 10 can be folded or bent according to a user's requirements.

The stretchable display 10 can be formed of an elastic material such as silicone (e.g., polydimethylsiloxane). Also, the stretchable display 10 can have a structure in which a serpentine structure or an island structure is connected to the stretchable device 10 by using a floating bridge so that a rigid metal wiring portion thereof has elasticity.

That is, as the stretchable display 10 is formed of an elastic and flexible material and the wiring portion thereof also has a stretchable structure, the stretchable display 10 is not damaged by stress but can be easily deformed so as to be used as a display device of a tablet, a mobile phone, a watch, or the like.

Accordingly, the user can use the stretchable device for various purposes. In particular, according to the device 1 including the stretchable display 10 according to at least one embodiment, not only shape of the display unit 100 can be deformed while the display unit 100 maintains a uniform size, but the size and position of the display unit 100 can also be changed.

That is, when the stretchable display 10 is deformed according to the shape of a device that a user wishes to use, the size and position of the display unit 100 are also changed.

The change of the size and position of the display unit 100 will be described in detail below.

The rear surface portion 30 formed on the rear surface of the stretchable display 10 can include driving elements that drive the device 1 such as a battery or a controller (not shown)

That is, various electronic components 12 having an appropriate shape or size and of an appropriate order that connect or communicate with one another in an appropriate manner can be included in the rear surface portion 30.

The electronic components 12 can be divided into modules and formed to have rigid island shapes. The electronic components 12 can also be connected to one another via wires in the form of bridges.

The battery having an appropriate size can be included so that the battery is located within the rear surface portion 30, but the battery is not limited thereto. Also, the battery can be of an appropriate type such as a lithium-ion based battery.

The controller can control the area of the display unit 100 where images are display and the size of the display unit 100 when the controller sensed that the stretchable display 10 is folded or bent as will be described in detail below.

The device 1 including the stretchable display 10 according to at least one embodiment includes a folding portion 40 and a bending portion 50 in the rear surface portion 30.

The folding portion 40 can be formed to correspond to a portion where the stretchable display 10 is folded and can be formed as a line in a vertical direction, as illustrated in FIG. 3.

The stretchable display 10 according to at least one embodiment is formed such that two ends thereof are foldable in a horizontal direction, as illustrated in FIGS. 1 and 3, and thus, the folding portion 40 is formed at each of the portions where the two ends of the stretchable display 10 can be folded.

However, the positions where the folding portion 40 is formed and the number of folding portions 40 are not limited thereto and the stretchable display 10 can be folded in various manners, and thus, the folding portion 40 can be formed to correspond to portions where the stretchable display 10 can be folded.

The device 1 including the stretchable display 10 according to the present embodiment can change the surface area of the display unit 100 according to a user's desire.

For example, when the user wishes to change the size of the display unit 100 when using the device 1 as a tablet or when the user wishes to use the device 1 as a watch or a mobile phone, the user can fold the device 10 at the folding portion 40 to change the surface area of the display unit 100. The change in the surface area of the display unit 100 by folding the device 1 including the stretchable display 10 according to at least one embodiment will be described in detail below.

The device 1 including the stretchable display 10 according to at least one embodiment includes the bending portion 50 at a center portion of the rear surface portion 30.

When the stretchable display 10 is bent after being folded according to a user's desire, the rear surface portion 30 can be deformed such that the device 1 is folded at the folding portion 40 and then bent so as to be wound around the wrist of the user.

The device 1 according to the present embodiment uses the stretchable display 10 and is thus flexible and elastic and can be folded or bent without damage to the stretchable display 10.

Accordingly, the rear surface portion 30 formed on the rear surface of the stretchable display 10 can also include the bending portion 50 so that the stretchable display 10 can be easily bent.

The bending portion 50 may not be limited to a predetermined region but may be formed to correspond to all regions where the stretchable display 10 is bent.

As illustrated in FIGS. 1 and 3, in the stretchable display 10 according to the present embodiment, the two ends of the stretchable display 10 can be folded at the folding portions 40 in a horizontal direction thereof and the bending portion 50 can be formed along the entire center portion of the rear surface portion 30.

However, the region where the bending portion 50 is formed is not limited thereto, and the bending portion 50 can be formed over the entire rear surface portion 30 to correspond to a region where the stretchable display 10 is bent.

The device 1 including the stretchable display 10 according to the present embodiment can further include a sensor unit or sensor 34 formed in the rear surface portion 30. In particular, the sensor unit can be formed at the folding portion 40 and/or the bending portion 50.

The sensor unit can sense the folding and/or bending of the stretchable display 10 when the rear surface portion 30 is folded and/or bent together with the stretchable display 10.

According to at least one embodiment, a strain gauge, that can measure strain, can be included in the sensor unit so that pressure applied to the stretchable display 10 can be detected. The strain gauge can be formed at the folding portion 40 and/or the bending portion 50 and can be used as an electronic component.

However, an element that detects strain and included in the sensor unit is not limited to the strain gauge but any element that senses strain or pressure can be used.

When strain is caused in the sensor unit including the strain gauge or a pressure detecting system, the detected strain can provide visual feedback to the user.

That is, when the stretchable display 10 is folded or bent, strain is measured and sensed, and when the folding or bending of the stretchable display 10 is sensed by the sensor unit, the controller can control the stretchable display 10 such that the display area of the images displayed on the stretchable display 10 is adjusted such that the stretchable display 10 displays only in a necessary area.

That is, when the display region is changed according to portions of the stretchable display 10 that remain visible after folding or bending the stretchable display 10, the energy efficiency and the usability can be improved.

The device 1 including the stretchable display according to at least one embodiment can be used as, for example, a tablet, and then as a mobile phone or a watch according to the user's requirements. The sensor unit can sense folding or bending of the stretchable display 10 to determine the type of use and the display region can be resized according to the type of use.

A coupling portion 60 can be included at each of two ends of the rear surface portion 30. As described above, the stretchable display 10 according to at least one embodiment can be used as a watch.

When the stretchable display 10 is used as a watch, the coupling portions 60 can be included at the two ends of the device so that the stretchable display 10 is wound around the wrist of the user and is fixed thereon.

According to an embodiment, the coupling portions 60 can be used to fix the two ends of the device by using a magnetic force. That is, by including materials having different magnetic properties at two ends of the device, the two ends of the device can be fixed by a magnetic force, particularly, by an attractive force.

Also, according to another embodiment, the coupling portions 60 can be a physical fixing unit. According to an embodiment, a ring-shaped fixing unit can be formed at one end of the device, and a groove portion into which the fixing portion can be inserted can be formed at the other end of the device so that the fixing unit can be fixed to the groove portion.

The coupling portions 60 are not limited to the above-described embodiment, and any coupling unit can be used as the coupling portions 60.

A hinge portion 70 can be further included on a side of the rear surface portion 30. The hinge portion 70 can be formed on the side of the rear surface portion 30 so that when the stretchable display 10 is bent to be used as a watch, it can be fixed in the bent state.

That is, the stretchable display 10 can be bent due to a material having elasticity and flexibility and can be bent at a uniform angle via the hinge unit 70 according to a user's desire. As such, the hinge unit 70 can be bent to a predetermined curvature and fix the stretchable display 10 at the predetermined curvature.

Also, after being bent, the stretchable display 10 can be fixed via the hinge portion 70 so that the angle at which the stretchable display 10 is bent is maintained to be substantially uniform.

As illustrated in FIG. 3, the hinge portions 70 can be included at predetermined intervals. The hinge portions 70 can be any element that is used to function as a hinge, and is not limited thereto.

The stretchable display 10 can be formed of an elastic and flexible material and thus can be easily folded or bent and the stretchable characteristics may be the greatest at the bending portion 50.

While the stretchable display 10 is formed of an elastic and flexible material overall, in particular, a region where the bending portion 50 is formed receives most strain. Thus, the stretchable display 10 can be manufactured such that stretchable characteristics are the greatest in the region where the bending portion 50 is formed. For example, the stretchable display 10 may be resilient to stretching in region corresponding to the bending portion 50 than the remaining portions of the stretchable display 10.

Figure 4A:
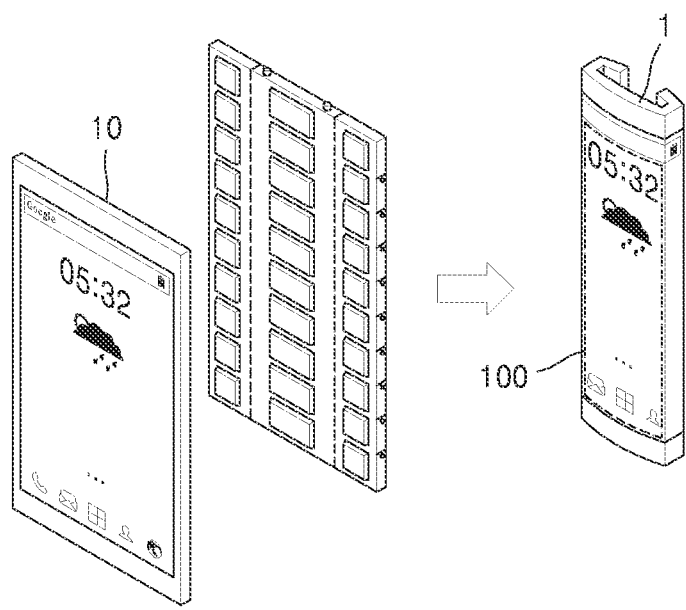
FIG. 4A illustrates an example of a device including a stretchable display when used as a mobile phone according to an embodiment.
Figure 4B:
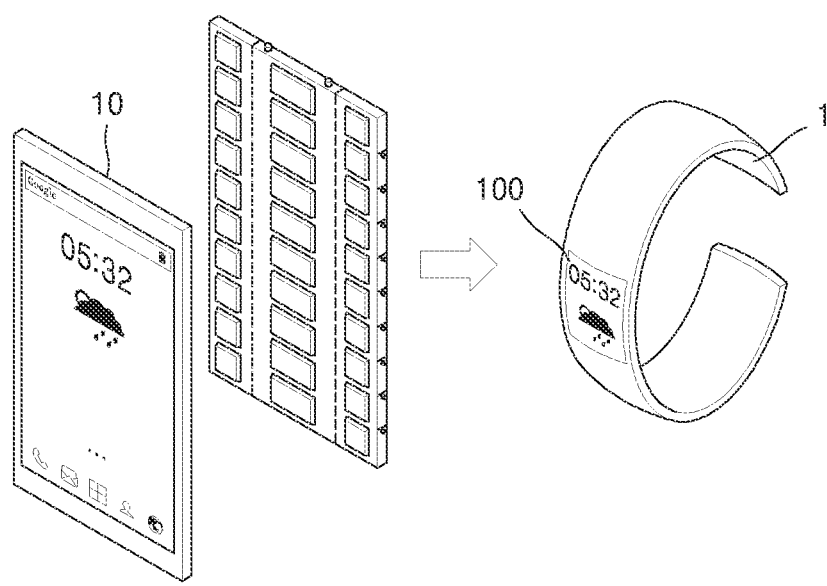
FIG. 4B illustrates an example of a device including a stretchable display when used as a watch according to an embodiment.

FIG. 4 illustrates the device 1 including a stretchable display according to an embodiment, deformed for various uses. FIG. 4A illustrates an example of a device 1 including a stretchable display 10 when used as a mobile phone. FIG. 4B illustrates an example of a device 1 including a stretchable device 10 when used as a watch.

Figure 5:
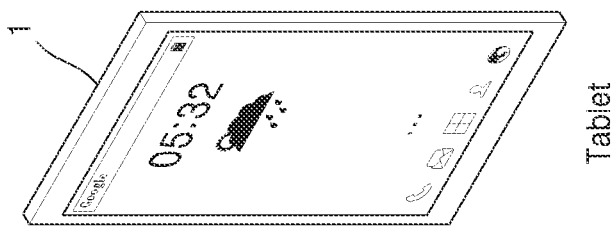
FIG. 5 illustrates a device including a stretchable display which can be reversibly used in the form factor of a tablet, a mobile phone, or a watch according to an embodiment.
Figure 5:
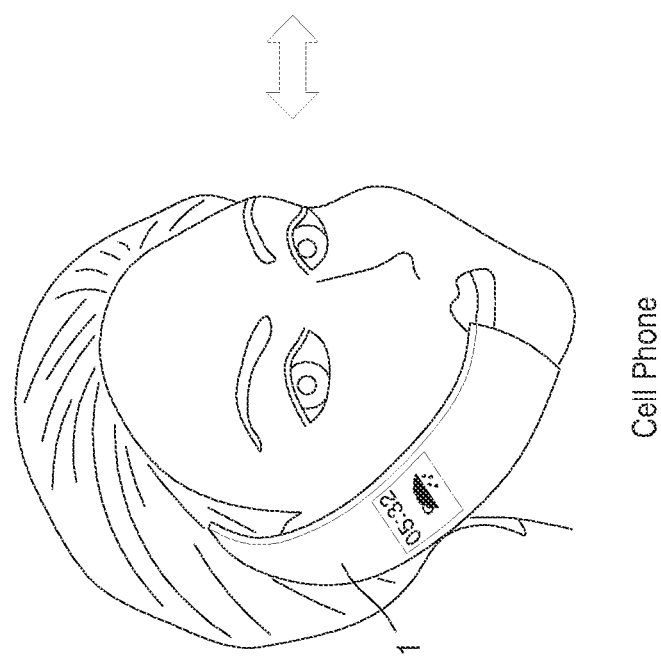
Figure 5:
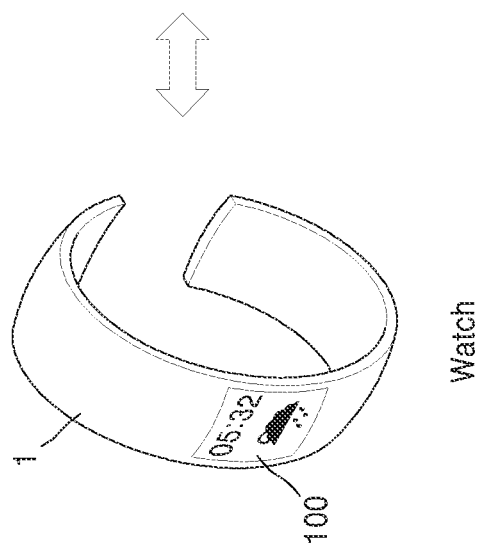

FIG. 5 illustrates a device 1 including a stretchable display 10 which can be reversibly used as a tablet, a mobile phone, or a watch according to an embodiment.

Like reference numerals all denote like elements, and thus the like elements will not be repeatedly described for convenience of description.

The device 1 including a stretchable display 10 according to the present embodiment can be deformed from a tablet to a mobile phone as illustrated in FIG. 4A or a watch as illustrated in FIG. 4B.

That is, the folding portion 40 of the stretchable display 10 can be folded to deform the whole shape of the stretchable display 10 according to a user's requirements. The display unit 100, which is a display region, can be adjusted according to the shape of the stretchable display 10 to use the device 1 as a mobile device.

As described above, when the user folds the device 1 along the folding portion 40, the folding can be sensed via the sensor unit formed at the folding portion 40 and the controller can recognize the sensing so as to provide feedback to adjust the display unit 100.

Accordingly, the size of the display 10 can be adjusted to a required size, and moreover, the unused portions of the display 10 do not display images, thereby increasing the energy efficiency.

Also, as illustrated in FIGS. 4 and 5, the device 1 including the stretchable display 10 used as a mobile phone can be deformed to a watch according to a user's requirements.

That is, the device 1 including the stretchable display 10 according to the present embodiment can further include the coupling portions 60 at the two ends thereof (see FIG. 3) and the two ends can be coupled to each other so that the device 1 can be used as a watch. When the device 1 is configured to be used as a watch, the device 1 may have a substantially circular shape due to the coupling of the coupling portions 60. Further, in some embodiments, the sensor unit can sense that the device 1 is in the substantially circular shape, and thus, the controller can control the device 1 to function as a watch.

Here, the user may bend the device 1 including the stretchable display 10 according to the width of the user's wrist so as to bend the stretchable display 10 around the wrist and use the device 1 as a watch.

The hinge portion 70 (see FIG. 3) can be included on the side of the rear surface portion 30 of the device 1 including the stretchable display 10 so that the device 1 is appropriately bent according to the width of the user's wrist to be fixed thereto.

When the device 1 that is used as a mobile phone is bent, the bending is sensed by the sensor unit that is arranged at the bending portion 50 and the controller can recognize the bending so as to provide feedback to adjust the size of the images display on the display unit 100. When the device 1 is configured to be used as a mobile phone, the device 1 may have a curved or substantially flat shape as shown in FIG. 5. Further, in some embodiments, the sensor unit can sense that the device 1 has the curved or substantially flat shape, and thus, the controller can control the device 1 to function as a mobile phone.

Accordingly, the user may wind the device 1 including the stretchable display 10 around the wrist and have the display unit 100 adjusted to a required size.

Also, when the device 1 including the stretchable display 10 is used as a watch according to user's requirements, the display unit 100 can be converted to a partial display mode.

The partial display mode can include display elements indicating a function of a watch and can be displayed in a simplified mode compared to a display unit of a tablet or a mobile phone. Thus, even when the total display area is reduced, necessary display elements can be displayed without any problems.

The device 1 including the stretchable display 10 can be deformed to a tablet, a mobile phone, or a watch as described above.

While embodiments are described above in which the device 1 used as a tablet is deformed to a mobile phone and then deformed from the mobile phone to a watch, the deformation can also be in the reverse order as illustrated in FIG. 5.

That is, when a call is received during use of the stretchable display 10 as a watch, the user can immediately deform the stretchable display 10 to a mobile phone.

When a call is received, coupling via the coupling portions 60 at the two ends of the stretchable display 10 can be released and the degree of bending can be adjusted appropriately.

That is, the stretchable display can be used as a mobile phone by adjusting the degree of bending such that the stretchable display bent around the wrist is bent so that one end is located at one ear and the other end is located at the mouth of the user.

After the stretchable display is deformed so as to use the same a mobile phone, when the call is ended, the user can bend the stretchable display again to use the display as a watch.

That is, the stretchable display can be reversibly deformed according to user requirements. Accordingly, the stretchable display can be used not only for one purpose but various purposes, thereby providing user convenience. This is enabled as the stretchable display is formed of an elastic and flexible, stretchable material and thus is easily folded and bent to be deformed to any shape.

In addition, the size and position of the display are of the display unit 100 can be deformed according to the type of use the device 1 is used, and thus, the display unit 100 can be displayed only in a region required by the user. Moreover, the display unit 100 is not displayed in unnecessary portions, and thus energy can be saved.

As described above, according to at least one of the above exemplary embodiments, by deforming the shape of the device 1 by folding or bending the device 1 due to stretchable characteristics of the stretchable display 10, the device 1 can be used for various purposes. Of course, the scope of the present disclosure is not restricted by this effect.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display device, comprising:
    a stretchable display including a display unit formed on a front side of the stretchable display and configured to display images in a display area;
    a support attached to a rear surface of the stretchable display and comprising a plurality of electronic components, wherein the stretchable display defines a surface area, and wherein the plurality of electronic components is overlapped with the surface area of the stretchable display; and
    a sensor formed on the support, wherein the support further comprises: a plurality of folding portions along which the support and the stretchable display are foldable, the plurality of folding portions formed as a plurality of lines configured to form corresponding edges when the display device is folded, wherein the lines extend along the support in a first direction; and
    a bending portion along which the support and the stretchable display are bendable in a second direction different than the first direction, wherein the bending portion includes an area between the lines, when the display device is bent, the lines of the plurality of folding portions are arranged surrounding the second direction,
    wherein the plurality of electronic components on the support comprises island shapes separated from each other, and the plurality of lines forming the folding portions, when the display device is folded, are formed between the separated electronic components, wherein the plurality of electronic components on the support are arranged in rows and columns, each of the columns being located between two folding portions and comprising at least two electronic components of the plurality of electronic components,
    wherein the sensor is formed at a position corresponding to the plurality of folding portions or the bending portion, and
    wherein the sensor is configured to sense when the display device is bent or folded;
    wherein the support further comprises a pair of coupling portions at opposing ends of the support;
    wherein each of the pair of coupling portions comprises a magnetic unit and wherein the pair of coupling portions are configured to couple the opposing ends of the support together; and
    wherein the support further comprises a hinge formed on a side of the support, wherein the hinge is configured to: i) bend the stretchable display to a predetermined curvature and ii) couple the stretchable display at the predetermined curvature.

2. The display device of claim 1, wherein each of the pair of coupling portions comprises a physical fixing unit and wherein the pair of coupling portions are configured to couple the opposing ends of the support together.

3. The display device of claim 1, wherein when the sensor senses that the display device is bent or folded, a size of the display area of the stretchable display is reduced.

4. The display device of claim 1, wherein the bending portion is more resilient to stretching than remainder of the stretchable display.

5. A display device, comprising:
    a stretchable display including a display unit formed on a front side of the stretchable display and configured to display images in a display area;
    a support attached to a rear surface of the stretchable display and comprising a plurality of electronic components; and
    a pair of coupling portions formed at opposing ends of the support, wherein the support further comprises:
    a plurality of folding portions along which the support and the stretchable display are foldable, the plurality of folding portions formed as a plurality of lines configured to form corresponding edges when the display device is folded, wherein the lines extend along the support in a first direction; and
    a bending portion along which the support and the stretchable display are bendable, wherein the bending portion includes an area between the lines, when the display device is bent, the lines of the plurality of folding portions are arranged surrounding a second direction,
    wherein the plurality of electronic components on the support comprises island shapes separated from each other, and the plurality of lines forming the folding portions, when the display device is folded, are formed between the separated electronic components, wherein the plurality of electronic components on the support are arranged in rows and columns, each of the columns being located between two folding portions and comprising at least two electronic components of the plurality of electronic components,
    wherein the pair of coupling portions are configured to be coupled and in direct physical contact with each other;
    wherein each of the pair of coupling portions comprises a magnetic unit and wherein the pair of coupling portions are configured to couple the opposing ends of the support together; and
    wherein the support further comprises a hinge formed on a side of the support, wherein the hinge is configured to: i) bend the stretchable display to a predetermined curvature and ii) couple the stretchable display at the predetermined curvature.

6. The display device of claim 5, further comprising a sensor which senses folding or bending of the stretchable display.

7. The display device of claim 6, wherein when the sensor senses that the stretchable display is bent or folded, a size of the display area of the display unit is reduced.

8. The display device of claim 5, wherein when the pair of coupling portions are coupled to each other, a size of the display area of the display unit is reduced.

9. A method of controlling a display device, wherein the display device comprises:

a stretchable display including a display unit formed on a front side of the stretchable display and configured to display images in a display area;

a support attached to a rear surface of the stretchable display and comprising a plurality of electronic components, wherein the stretchable display defines a surface area, and wherein the plurality of electronic components is overlapped with the surface area of the stretchable display; and a sensor formed on the support, wherein the support further comprises:

a plurality of folding portions along which the support and the stretchable display are foldable, the plurality of folding portions formed as a plurality of lines configured to form corresponding edges when the display device is folded, wherein the lines extend along the support in a first direction; and a bending portion along which the support and the stretchable display are bendable in a second direction different than the first direction, wherein the bending portion includes an area between the plurality of lines, when the display device is bent, the lines of the plurality of folding portions are arranged surrounding the second direction, wherein the plurality of electronic components on the support comprises island shapes separated from each other, and the plurality of lines forming the folding portions, when the display device is folded, are formed between the separated electronic components, wherein the plurality of electronic components on the support are arranged in rows and columns, each of the columns being located between two folding portions and comprising at least two electronic components of the plurality of electronic components, wherein the sensor is formed at a position corresponding to the plurality of folding portions or the bending portion, wherein the sensor is configured to sense when the display device is bent or folded, and wherein the method comprises:

the sensor sensing folding or bending of the plurality of folding portions or the bending portion; and the display unit adjusting a size of the display area when the sensor senses the folding or bending;

wherein each of a pair of coupling portions comprises a magnetic unit and wherein the pair of coupling portions are configured to couple opposing ends of the support together; and wherein the support further comprises a hinge formed on a side of the support, wherein the hinge is configured to: i) bend the stretchable display to a predetermined curvature and ii) couple the stretchable display at the predetermined curvature.

10. The method of claim 9, further comprising a controller, wherein when the sensor senses the folding or bending of the display device into a substantially circular shape, the controller is configured to control the display unit such that the display device is configured for use as a watch.

11. The method of claim 10, wherein when the sensor senses unfolding or unbending of the display device from the substantially circular shape, the controller is further configured to control the display device so that the display device can be used as a mobile terminal.

12. The display device of claim 1, wherein the support is bendable while being folded.

13. The display device of claim 5, wherein the support is bendable while being folded.

14. The method of claim 9, wherein the support is bendable while being folded.

15. The display device of claim 1, wherein the plurality of electronic components arranged on the rear surface of the stretchable display are not visible from the front side of the stretchable display having the display unit configured to display images in the display area.

* * * * *